(12) United States Patent
Schroll et al.

(10) Patent No.: US 6,640,028 B1
(45) Date of Patent: Oct. 28, 2003

(54) BEND-TYPE FIBER OPTIC LIGHT INJECTOR

(75) Inventors: Kenneth R. Schroll, Chatham, NJ (US); James P. Waters, Boonton Township, NJ (US)

(73) Assignee: General Dynamics Advanced Technology Systems, Inc., McLeansville, NC (US)

( * ) Notice: Subject to any disclaimer, the term of this patent is extended or adjusted under 35 U.S.C. 154(b) by 0 days.

(21) Appl. No.: 09/997,879

(22) Filed: Nov. 30, 2001

(51) Int. Cl.$^7$ .................................................. G02B 6/42
(52) U.S. Cl. ............................. 385/32; 385/49; 385/50; 385/52
(58) Field of Search ................................ 385/32, 31, 45, 385/49, 50, 51, 52

(56) References Cited

U.S. PATENT DOCUMENTS

| | | | |
|---|---|---|---|
| 3,208,342 A | 9/1965 | Nethercot, Jr. ........................ 88/61 |
| 4,134,640 A | 1/1979 | Auracher et al. ............. 350/96.15 |
| 4,164,364 A | 8/1979 | Witte ............................ 350/96.17 |
| 4,243,297 A | 1/1981 | Elion ............................ 350/96.15 |
| 4,402,568 A | 9/1983 | Kulich et al. ................. 350/96.16 |
| 4,511,207 A | 4/1985 | Newton et al. .............. 350/96.15 |
| 4,514,057 A | 4/1985 | Palmer et al. ............... 350/96.15 |
| 4,720,161 A | 1/1988 | Malavieille .................. 350/96.15 |
| 4,723,827 A | 2/1988 | Shaw et al. .................. 350/96.15 |
| 4,747,652 A | * 5/1988 | Campbell et al. ................. 385/32 |
| 4,813,757 A | 3/1989 | Sakano et al. ............... 350/96.14 |
| 4,859,022 A | 8/1989 | Opdahl et al. ................. 350/96.2 |
| 4,889,403 A | 12/1989 | Zucker et al. ............... 350/96.15 |
| 4,911,520 A | 3/1990 | Lee .............................. 350/96.2 |
| 4,938,552 A | 7/1990 | Jebens et al. ................. 350/96.2 |
| 4,946,236 A | 8/1990 | Dautartas et al. ............. 350/96.2 |
| 4,966,432 A | 10/1990 | Okada et al. ............... 350/96.15 |
| 4,991,922 A | 2/1991 | Dahlgren ..................... 350/96.15 |
| 5,035,482 A | 7/1991 | ten Berge et al. ........... 350/96.2 |
| 5,098,459 A | 3/1992 | Fukuma et al. ................ 65/4.21 |
| 5,175,776 A | 12/1992 | Lee ................................. 385/16 |
| 5,253,310 A | 10/1993 | Delbare et al. .................. 385/14 |
| 5,321,774 A | 6/1994 | Barnard et al. .................. 385/16 |
| 5,353,363 A | * 10/1994 | Keck et al. ...................... 385/46 |
| 5,517,590 A | * 5/1996 | Auborn et al. .................. 385/32 |
| 5,546,484 A | 8/1996 | Fling et al. ...................... 385/16 |
| 5,796,888 A | 8/1998 | Furukawa et al. .............. 385/22 |
| 5,832,149 A | 11/1998 | Omizu et al. .................... 385/20 |
| 5,864,643 A | 1/1999 | Pan ................................. 385/33 |
| 5,920,665 A | 7/1999 | Presby ............................ 385/16 |
| 6,031,947 A | 2/2000 | Laor ............................... 385/22 |
| 6,044,186 A | * 3/2000 | Chang et al. .................... 385/23 |

* cited by examiner

Primary Examiner—Hemang Sanghavi
Assistant Examiner—Eric Wong
(74) Attorney, Agent, or Firm—Jenner & Block, LLC

(57) ABSTRACT

An optical fiber is bent to form a discontinuous curve through which light can be injected into the fiber or extracted from the fiber. The bend can be formed by securing a portion of the optical fiber in a fixture and laterally displacing a portion of the fiber outside the fixture using a depressor. The depressor can be an integral part of the securing fixture or a separate device. The securing fixture can be adjustable so that the degree and location of the bend can be varied. Injected light can be sourced from a second optical fiber, and extracted light can be supplied to a second optical fiber which can have a lens at its free end.

23 Claims, 3 Drawing Sheets

BEND-TYPE FIBER OPTIC LIGHT INJECTOR

BACKGROUND OF THE INVENTION

1. The Technical Field

The present invention is directed to the field of fiber optics. More particularly, the present invention is directed to an apparatus and method for injecting light into an optical fiber.

2. The Prior Art

Commercial single mode optical fiber couplers typically are made by twisting two uncoated optical fibers together, heating the twisted region, and pulling on the fiber ends to reduce the diameter of the heated and softened region. When the fiber diameters are reduced sufficiently, the core modes overlap to produce the desired coupling. In principle, this method could be applied to couple active fibers without interrupting data transmission through the fibers, but the procedure would be very risky and would require complex, specialized equipment and precise control over the drawing process. The finished coupler would be permanent and non-adjustable.

Another method for coupling active fibers in a non-interrupting manner involves forming a macrobend, typically a constant-radius curve, in the subject fiber and injecting light through the bend into the core of the subject fiber. Such an injector can consist of a cleaved single mode fiber plus a suitable lens. Injection efficiency (the fraction of the light leaving the injector which actually couples into the core mode of the subject fiber) using the macrobend approach tends to be very low due to inherently poor coupling. In addition, the macrobend techniques are usually applied only to conventional polymer-coated fiber because of the reliability concerns associated with bare fiber. When injecting through the polymer coating, aligning the injection source with the single mode core of the bent fiber is extremely difficult, and the resulting coupling is very inefficient. The basic macrobend technique also can be used to extract light from an optical fiber. For example, some commercial "fiber identifiers," used by fiber system installers, utilize the macrobend technique for extracting light to identify active fibers and light propagation direction.

The macrobend approach typically is not used for permanent couplers because of inherent inefficiencies, plus reliability concerns related to the fiber bending stresses. Bend-type couplers tend to subject the fiber to high bending stresses which are detrimental to the reliability of the fiber because of a phenomenon known as static fatigue. Static fatigue can cause a fiber in bending or tension to fail over time due to the propagation of cracks. The higher the initial stress a fiber is subjected to, the shorter its life is likely to be. Although it is known to use heat to anneal the bent fiber to remove the stress, this technique results in a permanent bend and, therefore, a coupler that is always "on" and not adjustable. Also, elaborate equipment and precise control are required to practice this technique.

Accordingly, it would be desirable to provide an adjustable fiber optic coupler which allows efficient light injection into an active fiber to increase capacity without disrupting existing traffic through the fiber.

SUMMARY OF THE INVENTION

The present invention provides a method and apparatus for efficiently injecting light through the side and into the core of a single mode optical fiber as an alternative to the conventional approach of severing the fiber to splice in a pre-made coupler. The present invention makes possible, for example, the insertion of additional wavelengths into a fiber carrying WDM (wavelength division multiplexed) signals, without disrupting the existing traffic. Using the method and apparatus of the present invention, it is possible to upgrade the transmission capacity of an active fiber or network without shutting down the system, and without requiring an alternate, or "protect," fiber to temporarily carry the traffic.

A light injector according to the present invention is adjustable and may be switched on and off. It can handle high data rates as well as WDM signals. In addition, the reciprocal behavior of this bend-type device allows it to be used to extract, or "drop," an adjustable fraction of light from the fiber core into a detector or another fiber.

A light injector according to the present invention includes a traffic fiber, an injector or extractor fiber, a first fixture which secures the traffic fiber, and a second fixture which secures the injector or extractor fiber. The injector or extractor fiber preferably includes a lens for directing light to be injected therefrom to the traffic fiber or for collecting light extracted from the traffic fiber.

The fixtures can be combined in an integral unit or they can be separate units. In either case, the fixtures secure the fibers in a predetermined alignment with each other. The first fixture can have square edges where the traffic fiber exits it. Alternatively, the first fixture can include a curved or cylindrical mandrel about which the traffic fiber can be bent, as discussed further below. The mandrel can be movable in a direction parallel and/or perpendicular to the traffic fiber's longitudinal axis, or centerline.

A depressor is provided to deflect a portion of the traffic fiber, thus creating a bend in the fiber. Preferably, the depressor is located within a few fiber diameters of the point where the traffic fiber exits the first fixture, namely, the transition point, although it can be located at greater distances from the transition point in some embodiments. The depressor can be integral with or separate from either or both of the two fixtures. The injector or extractor fiber can act as the depressor.

DETAILED DESCRIPTION OF THE DRAWINGS

Figure 1:
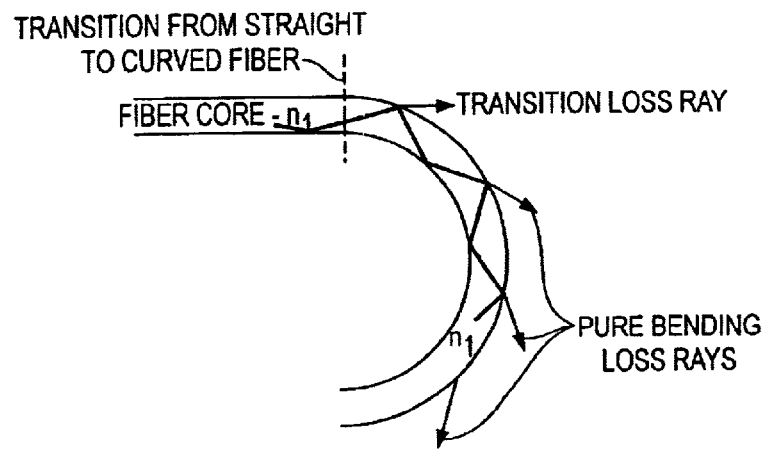
FIG. 1 is a diagram representing a simple model of transition and pure bending losses in an optical fiber.

When an optical fiber is bent into a curve, light can leak out of or be injected into the fiber if the curvature is great enough. Where the curvature is sufficient to, for example, cause light to leak out, the light actually leaves the curved section of the fiber in a series of discrete output rays, as illustrated in FIG. 1. The first of these output rays following the curvature discontinuity occurring at the transition from straight fiber (zero curvature) to curved fiber is referred to as the transition loss ray. Subsequent output rays along the curved fiber are referred to as pure bending loss rays.

The transition loss is defined as the loss at the curvature discontinuity, i.e., the loss due to the transition loss ray. It is evident from FIG. 8 and the foregoing discussion that the transition loss is not affected by the length of the bend. However, pure-bending losses will occur in addition to the transition loss if the bend is long enough.

The present invention makes use of the transition loss while striving to not generate pure bending loss. The present invention achieves the curvature discontinuity required to stimulate only the transition loss by inducing a short and abrupt transition from straight to curved fiber. One way to realize only the transition loss in practice is to configure the fiber as a very short cantilever beam, as illustrated in, for example, FIG. 2. If the fiber is straight on either side of the short cantilever section, there is insufficient curved fiber to cause any substantial pure bending loss.

Figure 2:
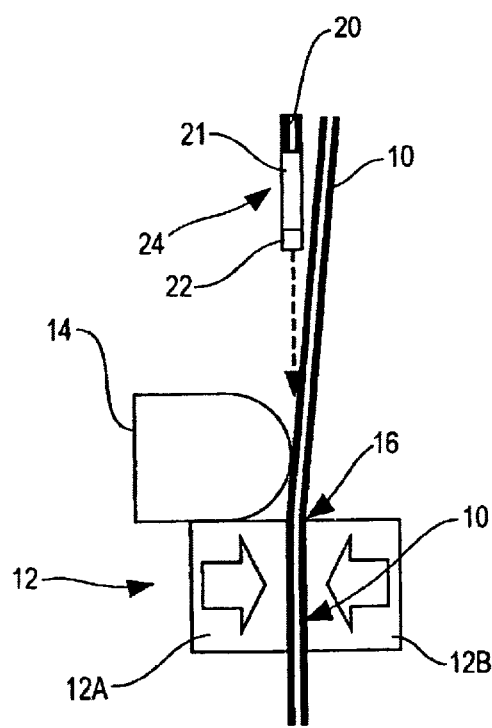
FIG. 2 is a side view of a first embodiment of a bend-type light injector according to the present invention.

FIG. 2 illustrates an optical fiber 10, a portion of which is secured in a clamp 12 having first and second clamp halves 12A and 12B, respectively. An adjustable fiber depressor 14 acts on the portion of fiber 10 outside clamp 12 so as to bend that portion of fiber 10 about the edge of clamp 12 where fiber 10 exits clamp 12. As shown in FIG. 2, the portion of fiber 10 in clamp 12 is substantially straight (i.e., has substantially zero curvature) and the portion of fiber 10 between clamp 12 and depressor 14 is curved. The maximum curvature in fiber 10 occurs at the clamp exit 16, also referred to as the pinch point. The curvature in fiber 10 decreases to zero at the point of contact with depressor 14. A light injector 24 comprising a second optical fiber 20 having a lens 22 at its free end is aligned with fiber 10 and aimed at the bent portion thereof. More particularly, light injector 24 is aimed at pinch point 16.

The magnitude of the transition effect is proportional to the maximum curvature, which is a function of the cantilever length and the depressor deflection. The cantilever length is the length between the clamp exit 16 and the point of contact of depressor 14 with fiber 10. The depressor deflection is the perpendicular distance depressor 14 displaces fiber 10 at its point of contact with depressor 14 in order to produce the bend. A measure of the "strength" of the discontinuity is the value of the maximum curvature, or its reciprocal, the minimum bend radius. In the injection mode, increasing the depressor deflection to increase the maximum curvature, i.e., reduce the minimum bend radius, at pinch point 16, and thereby increase the strength of the discontinuity, effectively creates a bigger target for light injector 24 to hit. Again, the injector optics are designed to focus at pinch point 16. The greater the strength of the discontinuity, the greater the fraction of light leaving injector 24 which can be coupled into fiber 10, making the injection more efficient. With a fixed intensity source, adjustable depressor 14 provides for adjusting the power injected into the core of fiber 10 by varying the curvature at pinch point 16, thereby varying the strength of the discontinuity. A single device of this design can operate successfully in either the injection or extraction mode using a broad range of fiber types (i.e., a broad range of fiber index profiles). although the invention can be practiced using multi-mode fibers, single mode fibers are preferred.

Optical fiber typically includes a relatively soft polymer coating which serves to protect the fiber from physical damage. Preferably, this polymer coating is removed from at least the portion of fiber 10 held in clamp 12 and the portion of fiber 10 in the region of pinch point 16, i.e., the portion of fiber 10 through which light is to be injected or extracted. Thus, clamp 12 acts directly on the glass cladding or on a thin, rigid coating applied to the cladding after the polymer coating has been removed. The required curvature discontinuity, which is created at pinch point 16, cannot be maintained if the soft polymer coating is left on, because the rigid glass fiber tends to "creep" within the relatively soft coating. This tends to flatten out the discontinuity and destroys the transition effect. Working directly on the fiber cladding (or on a thin, rigid coating layer) results in a device with stable performance, because there are no soft materials under load which may creep over time. Preferably, the soft polymers coating is further removed from the portion of fiber 10 in contact with depressor 14 for similar reasons, though this might not be necessary in embodiments using longer cantilever lengths. Certain approaches to protecting the uncoated portions of fiber 10 from damage and excessive stress are described below.

One characteristic of an elastic, cantilever beam is that a given value of maximum curvature (which occurs at the pinch point) can be achieved over a substantial range of cantilever length by appropriately adjusting the deflection at the depressor. For example, a relatively long beam requires a greater depressor deflection to achieve a given maximum curvature than does a relatively short beam.

With respect to the present invention, it is preferable to make the cantilever of fiber 10 very short (e.g., <800 microns, for a typical 125 micron fiber) in practice for two important reasons. First, by keeping the cantilever short, only the transition effect is stimulated, and no pure bending effects are generated. This feature of the present invention yields high efficiency in both the injection and extraction modes. Second, if the cantilever is sufficiently short and depressor 14 has the proper profile, depressor 14 won't occlude the injected or extracted light beam. If the cantilever is relatively long, more depressor deflection is required to achieve the same maximum curvature/transition strength. Under these circumstances, the depressor potentially could physically occlude the light beam, i.e., a portion of depressor 14 could lie between pinch point 16 and injector 24. This problem could be mitigated by using a transparent, index-matched depressor, thus preventing optical occlusion even where physical occlusion might occur.

According to a preferred embodiment of the present invention, integral lens 22 is a segment of gradient index fiber 21 fusion-spliced to a piece of coreless fiber, which in turn is fusion spliced to injector fiber 20. However, other lens arrangements would also work, though some presumably would cause greater alignment difficulty. In the preferred embodiment, the alignment feature described above and further below assures correct alignment for high efficiency. If the lens is separate from the pickup fiber, the required alignment is liable to be much more difficult. While a larger diameter lens might in principle improve the injection or pickup efficiency, the separate lens would have to be precisely aligned (to within ~1 micron) to both the pinch point and to the injector fiber. This could involve as many as ten linear and angular adjustments of the lens and injector fibers, instead of a single linear adjustment of the injector in the preferred embodiment.

Figure 3:
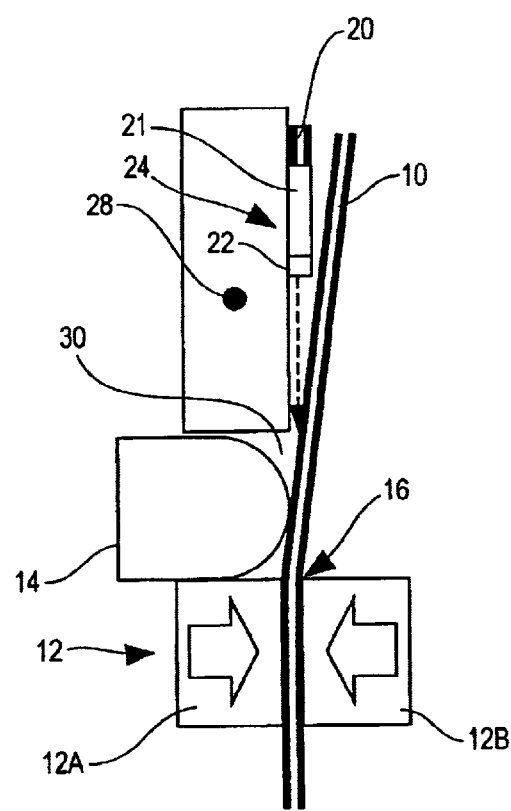
FIG. 3 is a side view of a second embodiment of a bend-type light injector according to the present invention.

As suggested above, for the most efficient injection, the path for the input beam, i.e., the output from light injector 24, should be substantially coextensive with the centerline of the straight portion of fiber 10 secured in clamp 12. This generally is true regardless of the depressor deflection and, hence, the transition strength. One way to employ this concept in practice is illustrated in FIG. 3. In this embodiment, the clamping surface of first clamp half 12A is extended to provide a support and an alignment feature 28 for light injector 24. That is, first clamp half 12A and support and an alignment feature 28 are integrated. A cut-out 30 can be provided in the extended portion of first clamp half 12A to facilitate the operation of depressor 14 against optical fiber 10. Preferably, light injector 24, including injector fiber 20 and injector lens 22, is the same diameter as cantilevered fiber 10 in order to facilitate the alignment.

An advantage to this embodiment of the invention is that first clamp half 12A and the high-precision alignment feature 28 can be made as a single unit, for example, as a single precision molding or machined from metal or other material in a single, continuous pass. The precise alignment feature could also be provided by means of a standard silicon v-groove chip.

Figure 4:
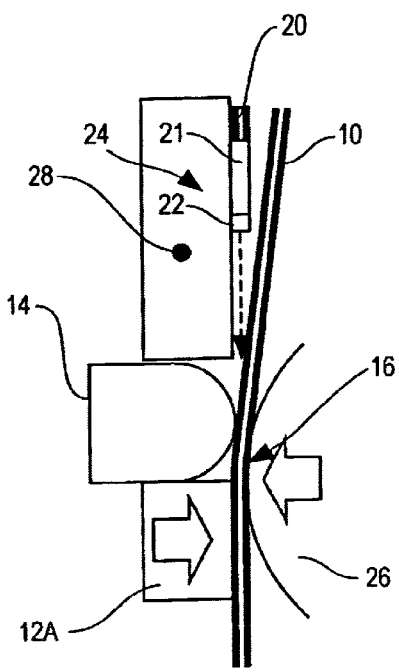
FIG. 4 is a side view of a third embodiment of a bend-type light injector according to the present invention.

Another embodiment of the invention employs a different kind of clamp 12, as illustrated in FIG. 4. In this embodiment, the second clamp half 12B illustrated in FIGS. 1 and 2 is replaced with a circular or curved mandrel 26. In this embodiment, pinch point 16 is at top-dead-center on mandrel 26. This approach eases alignment of the clamp halves 12A and 12B, and curved mandrel 26 serves as a stress limiter for fiber 10, because the fiber bend radius can't be any smaller than the mandrel radius.

Figure 5:
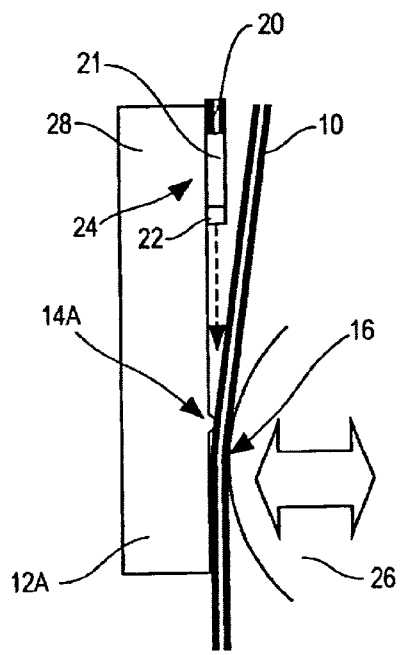
FIG. 5 is a side view of a fourth embodiment of a bend-type light injector according to the present invention.

In yet another embodiment, illustrated in FIG. 5, depressor 14 is fixed to produce a particular deflection, and curved mandrel 26 can be moved perpendicular to the fiber to adjust the strength of the curvature discontinuity, and hence the strength of the transition loss. Such perpendicular movement would tend to change somewhat the precise location of the transition point 16 in fiber 10. To maintain high efficiency, light injector 24 would need to be adjusted to follow the changing transition point location. In this embodiment, depressor 14 could be implemented, for example, as a fixed bump in the part of clamp 12 opposite mandrel 26. For a short cantilever with a length of 800 microns, the depressor deflection would typically be 40–50 microns to produce a minimum bend radius of about 5 mm.

Figure 6:
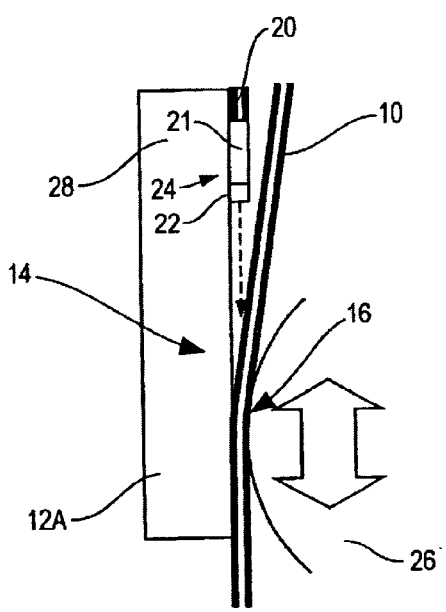
FIG. 6 is a side view of a fifth embodiment of a bend-type light injector according to the present invention.

In an alternative embodiment, mandrel 26 can be kept in contact with fiber 10, but moved along the length of fiber 10 to adjust the cantilever length by moving pinch point 16, as illustrated in FIG. 6. Changing the cantilever length by moving pinch point 16 to adjust the transition strength may cause reduced efficiency unless light injector 24 follows the changing pinch point location. Notwithstanding, any such reduced efficiency may be an acceptable compromise to achieve simpler adjustability.

Figure 7:
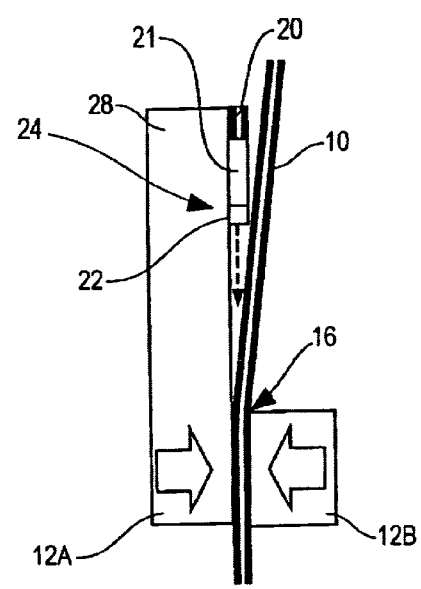
FIG. 7 is a side view of a sixth embodiment of a bend-type light injector according to the present invention.

Yet another embodiment of the present invention employs the injector lens 22 as a depressor, as shown in FIG. 7. This arrangement does not require or use a separate depressor that might occlude the injected light beam, and the overall structure is simplified. The transition strength could be adjusted by moving the pinch point relative to the lens/depressor, but efficiency would be optimum only when the pinch point is at the object distance for which the lens is designed.

Figure 8:
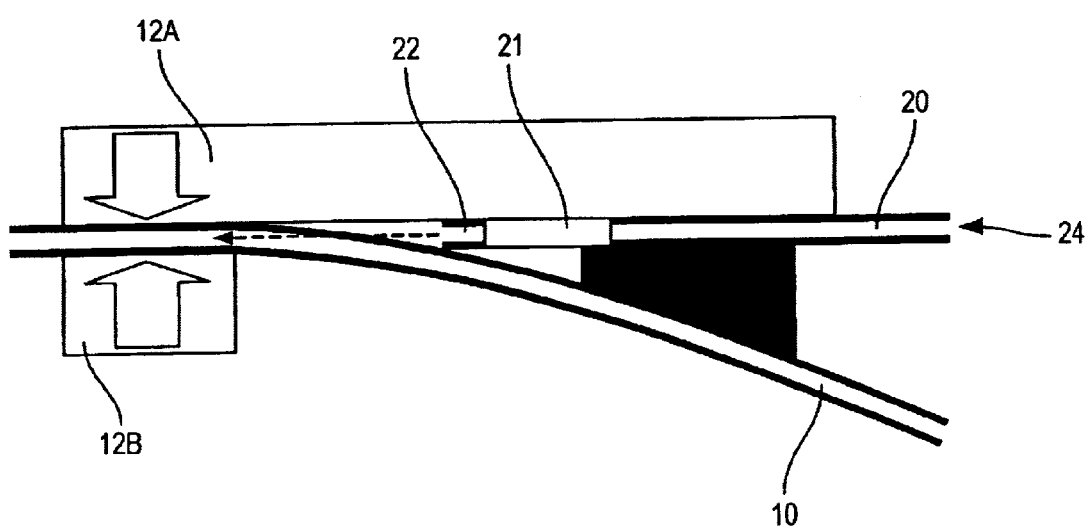
FIG. 8 is a side view of a seventh embodiment of a bend-type light injector according to the present invention.

The most efficient embodiments of our invention utilize a short cantilever length to assure that only the transition effect is stimulated. However, a longer cantilever with the depressor outboard of the injector lens may be easier to implement. In such an embodiment, as illustrated in FIG. 8, there is no depressor occlusion to worry about. While the efficiency could suffer because the longer cantilever length results in the inclusion of some pure bending effects, this may be a worthwhile tradeoff in many applications.

Typical macrobend couplers are designed for use with optical fiber which has the original soft, polymer coating intact. This coating protects the glass surface from damage that could lead to crack initiation and eventual fiber failure. According to a preferred embodiment of the present invention, as discussed above, the polymer coating is removed from fiber 10 in the region where clamp 12 is to be applied, as well as the region outboard of the clamp where the injected light beam enters the fiber. In some embodiments, a thinner, more rigid coating then is applied over the fiber cladding. The most favorable such coating appears to be one of the "sol-gels", which are essentially glasses grown from solution. The thickness of the new coating preferably is no more than a few microns, and possibly less than one micron. The thin sol-gel coating would protect the fiber cladding from mechanical abrasion and isolate it from hydroxyl ions ($OH^-$) which promote stress corrosion or static fatigue in the bent fiber. Preferably, the refractive index of this thin coating matches the refractive index of the fiber cladding.

An alternative approach to protecting the fiber surface where the coating has been removed may be to immerse the bare region in a moisture-excluding liquid or gel. This protection may be provided "automatically" as a byproduct of the fact that, in order to achieve a functional coupler, the region in which the injected beam propagates from the injector lens to the bent fiber must have a refractive index closely matching the fiber cladding index. An index-matching gel or liquid (possibly a hybrid sol-gel) can be used to fill this region and also to protect the bare fiber surface.

Yet another way to protect the fiber in the region of the bend is to coat the bare section with a fully-hermetic metal layer which would totally exclude moisture and provide mechanical protection. This can be accomplished, for example, by means of an electroless plating technique patented by Robert Filas of Lucent Technologies. In the injector application, the section of fiber subjected to bending stresses (i.e., the cantilever region) would be protected by the metal coating. A small region of the metal coating would be removed to create a "window" to allow entry of the injected light beam. It has been shown that hermetic fiber coatings can be removed locally by means of a $CO_2$ laser beam. In the short cantilever, the fiber region between the depressor and the injector lens (where the window is required) is either straight (and therefore not stressed) or bent only slightly to get the injector closer to the pinch point.

While the principal objective o f the present invention is to provide a means of increasing transmission capacity by injecting light into an active fiber without interrupting existing traffic, the reciprocal behavior of the device allows it to be used as an efficient light extractor. All of the advantageous features of the injector apply equally to the extractor. In fact, computer modeling predicts that in the extraction mode, 80% of the light leaving the core at the transition can be coupled into the core of a suitably lensed single mode pickup fiber.

Compared to typical macrobend couplers, the present invention is capable of much higher efficiency light injection (and extraction). In addition, the present invention provides much more stable performance on single mode fibers, which require extremely precise alignments to achieve any coupling at all. Conventional macrobend couplers are designed for use on coated fiber, and the soft coating makes it nearly impossible to maintain the required alignments.

Compared to the conventional fused coupler fabricated by twisting, heating and drawing the two fibers, the present invention is much less risky to install on a traffic-carrying fiber. With the standard fused coupler, there is a severe danger of breaking the active fiber, and it is unlikely that the coupler could be installed without at least temporarily causing unacceptable loss in the fiber.

The foregoing description is merely illustrative of the present invention. Those skilled in the art will recognize that modifications and variations thereto can be implemented without departing from the spirit of the invention, the scope of which is defined by the claims appended hereto.

We claim:

1. An apparatus for transferring light between a first optical fiber having a longitudinal axis and a second optical fiber, comprising:

a first fixture securing a first portion of said first optical fiber;

a depressor operably associated with a second portion of said first optical fiber, said depressor configured to selectively displace said second portion of said first optical fiber in a direction substantially perpendicular to said longitudinal axis, such that a bend is selectively formed in said second portion of said first optical fiber; and a second fixture securing said second optical fiber;

wherein the curvature of said bend proximate an interface between said first and second portions of said first optical fiber is discontinuous;

wherein said second optical fiber is in a predetermined alignment with said interface.

2. The apparatus of claim 1 wherein said first fixture comprises a first clamp section and a second clamp section.

3. The apparatus of claim 2 wherein said first clamp section is integral with said second fixture.

4. The apparatus of claim 2 wherein second clamp section is a curved mandrel.

5. The apparatus of claim 2 wherein said depressor is integral with said first fixture and said first clamp section.

6. The apparatus of claim 1 wherein a non-rigid coating has been removed from at least a first region of said first optical fiber.

7. The apparatus of claim 6 wherein a rigid coating has been applied to said at least a first region of said first optical fiber.

8. The apparatus of claim 1 wherein said second optical fiber further comprises a lens.

9. A method for transferring light between a first optical fiber and a second optical fiber, comprising the steps of:

securing a first portion of said first optical fiber in a first fixture;

securing a portion of said second optical fiber in a predetermined orientation with respect to said first optical fiber;

laterally displacing a second portion of said first optical fiber so as to form a bend in said first optical fiber in a region proximate an interface between said first portion of said first optical fiber and said second portion of said first optical fiber, the curvature of at least a portion of said bend proximate said interface being discontinuous; and aligning said second optical fiber with said first optical fiber and said interface region in a predetermined alignment.

10. The method of claim 9 further comprising the step of removing a coating from at least said first portion of said first optical fiber.

11. The method of claim 10 further comprising the step of applying a substantially rigid coating to said first portion of said first optical fiber.

12. An apparatus for injecting light into a first optical fiber, comprising:

a first fixture for securing a first portion of said first optical fiber;

a depressor for laterally displacing a second portion of said first optical fiber, wherein said lateral displacement causes a bend to be formed in said second portion of said first optical fiber proximate said fixture; and a light source configured to direct light at said bend in said first optical fiber;

wherein the curvature of at least a portion of said bend is discontinuous.

13. The apparatus of claim 12 wherein said light source comprises a second optical fiber.

14. The apparatus of claim 13 wherein said second optical fiber further comprises a lens.

15. The apparatus of claim 12 further comprising a second fixture securing said light source.

16. The apparatus of claim 15 wherein said second fixture secures said second optical fiber in a predetermined alignment with said first optical fiber, said predetermined alignment selected so as to facilitate the transfer of light between said first and second optical fibers.

17. The apparatus of claim 12 wherein said first fixture is integral with said second fixture.

18. The apparatus of claim 17 wherein said depressor is integral with said first and second fixtures.

19. The apparatus of claim 12 wherein said first fixture comprises a first clamp section and a second clamp section.

20. The apparatus of claim 19 wherein said second clamp section comprises a curved mandrel.

21. The apparatus of claim 19 wherein said second clamp section comprises a substantially cylindrical mandrel.

22. The apparatus of claim 21 wherein said mandrel is movable with respect to said first clamp section and said depressor.

23. The apparatus of claim 13 wherein said second optical fiber and said depressor comprise an integrated unit.

* * * * *